(12) United States Patent
Piwonski et al.

(10) Patent No.: US 11,179,911 B2
(45) Date of Patent: Nov. 23, 2021

(54) RADIALLY SHRINKABLE TEXTILE SLEEVE

(71) Applicant: iprotex GmbH & Co. KG, Münchberg (DE)

(72) Inventors: Timo Piwonski, Marktrodach (DE); Maximilian Kefes, Weissdorf (DE); Norbert Bergmann, Münchberg (DE)

(73) Assignee: IPROTEX GMBH & CO. KG, Münchberg (DE)

( * ) Notice: Subject to any disclaimer, the term of this patent is extended or adjusted under 35 U.S.C. 154(b) by 153 days.

(21) Appl. No.: 16/498,082

(22) PCT Filed: Mar. 16, 2018

(86) PCT No.: PCT/EP2018/056676
§ 371 (c)(1),
(2) Date: Sep. 26, 2019

(87) PCT Pub. No.: WO2018/177775
PCT Pub. Date: Oct. 4, 2018

(65) Prior Publication Data
US 2020/0101691 A1    Apr. 2, 2020

(30) Foreign Application Priority Data
Mar. 27, 2017  (DE) .................... 10 2017 002 901.6

(51) Int. Cl.
| B32B 1/08 | (2006.01) |
| B32B 5/02 | (2006.01) |
| B32B 7/09 | (2019.01) |
| B32B 5/24 | (2006.01) |
| B32B 7/12 | (2006.01) |

(52) U.S. Cl.
CPC ................ B32B 1/08 (2013.01); B32B 5/024 (2013.01); B32B 5/026 (2013.01); B32B 5/245 (2013.01);
(Continued)

(58) Field of Classification Search
CPC .. B32B 1/08; B32B 5/02; B32B 5/024; B32B 5/026; B32B 5/04; B32B 5/06;
(Continued)

(56) References Cited

U.S. PATENT DOCUMENTS

| 6,627,274 B1 | 9/2003 | Ginossatis et al. |
| 2009/0205738 A1* | 8/2009 | Herborth ............. B29D 23/001 138/149 |

(Continued)

FOREIGN PATENT DOCUMENTS

| CN | 201273411 Y | 7/2009 |
| DE | 29710583 U1 | 9/1998 |

(Continued)

OTHER PUBLICATIONS

International Search Report for Application No. PCT/EP2018/056676 dated Jun. 7, 2018.

*Primary Examiner* — Walter Aughenbaugh
(74) *Attorney, Agent, or Firm* — Pearne & Gordon LLP

(57) ABSTRACT

Radially shrinkable textile hose for encasing elongated objects, characterised by having an outer layer made from radially shrinkable, wear-resistant material and at least one inner layer made from thermally insulating material.

12 Claims, 5 Drawing Sheets

(52) U.S. Cl.
CPC ............... *B32B 7/09* (2019.01); *B32B 7/12* (2013.01); *B32B 2307/554* (2013.01); *B32B 2307/736* (2013.01); *B32B 2597/00* (2013.01)

(58) Field of Classification Search
CPC .... B32B 5/08; B32B 5/10; B32B 5/12; B32B 5/245; B32B 7/09; B32B 7/12; B32B 7/14; B32B 2307/554; B32B 2307/736; B32B 2597/00; B29C 63/00; B29C 63/0017; B29C 63/02; B29C 63/06; B29C 63/10; B29C 63/14; B29C 63/42; B29C 2063/021; Y10T 428/139; Y10T 428/1393
See application file for complete search history.

(56) References Cited

U.S. PATENT DOCUMENTS

| | | | | |
|---|---|---|---|---|
| 2015/0136269 | A1* | 5/2015 | Chung | F16L 11/24 138/124 |
| 2016/0016376 | A1* | 1/2016 | Woodruff | B32B 15/14 428/190 |

FOREIGN PATENT DOCUMENTS

| | | |
|---|---|---|
| EP | 0518032 A1 | 12/1992 |
| EP | 0520473 A1 | 12/1992 |
| EP | 1685285 B1 | 12/2010 |
| GB | 2047620 A | 12/1980 |
| JP | S53-121078 A | 10/1978 |

* cited by examiner

RADIALLY SHRINKABLE TEXTILE SLEEVE

This is a National Stage application of PCT international application PCT/EP2018/056676, filed on Mar. 16, 2017 which claims the priority of German Patent Application No. 10 2017 002 901.6, filed Mar. 27, 2017, both of which are incorporated herein by reference in their entirety.

The present invention relates to a radially shrinkable textile hose for encasing elongated objects.

EP 1 685 285 B1 discloses a radially shrinkable textile fabric hose which is woven in two layers, with an upper and a lower fabric layer, the fabric layers being joined together at their edges with binding warp threads and thus forming a hose. Such hoses are used, for example, in the area of automotive technology for mechanical reinforcement and for increasing the wear resistance of pipes and tubes. For this purpose, they are pulled over elongated objects such as pipes, tubes and also foam pipes and then shrunk. This then provides protection against mechanical abrasion. In addition, there is the use of foam pipes, e.g. EPDM foam pipes for insulation. In practice, foam tubes are currently used, e.g. EPDM-based, to protect pipes in the car against heat losses or the effects of cold. On the one hand, these may be pipes carrying a medium, e.g. coolants. Likewise, electrical wiring harnesses are also sheathed with them. One of the purposes of insulation is to prevent possible loss of power in the drive system of a motor vehicle which may occur as a result of heat loss. On the one hand the EPDM foam pipes mentioned above have a high insulation capacity, but on the other hand they are extremely susceptible to mechanical effects, e.g. abrasion.

Due to increasingly tighter installation spaces in automotive construction, there is a high probability that foam pipes used in the engine compartment of a motor vehicle for thermal insulation will come into contact with other, for example hot or abrasive, components. Depending on the intensity of the contact, high abrasive forces may act on the foam pipe which can lead to rapid destruction of the foam pipe and thus severely limit the insulation effect.

An object of the present invention is thus to propose a radially shrinkable textile hose for encasing elongated objects which now avoids or at least greatly diminishes the known disadvantages in prior art.

The object is achieved with a hose according to claim 1, namely a radially shrinkable textile hose for encasing elongated objects which is characterised by an outer layer made from shrinkable, wear-resistant material and at least one inner layer made from thermally insulating material. Such a hose according to the invention—with defined thermal conductivity and simultaneously high mechanical resistance against abrasion—can be shrunk onto abrasion-prone rods, tubes, wiring harnesses, pipes, profiles and piping that are to be thermally insulated and need not be stretched out but may show any kinks, said hose being shrunk on in a single work operation and firmly fixed there essentially immovably. Advantageously, this means there is no need to subsequently fit a plurality of layers one over the other. It also prevents damaging the abrasion-prone insulation layer, e.g. EPDM foam pipe. Such a hose may be designed, for example, in such a manner that it is woven with multifilament warp threads running axially and shrinkable monofilament weft threads running circumferentially. On shrinking the hose according to the invention, the outer layer of the sheath tends to narrow the hose radially due to the shrinkable monofilament weft threads. Of course, for this purpose the outer layer has the property according to the invention of shortening in the circumferential direction in order to bring about a narrowing in the radial direction.

To keep the assembly effort during fabrication as low as possible, the protective hose can preferably be fitted in the production section in a single operation. For this reason, the textile hose according to the invention is favoured as its multi-layer structure can be produced in a single operation, thus eliminating the need for a great deal of assembly effort resulting from subsequently fitting a plurality of layers one over the other.

In an advantageous embodiment of the invention, the hose is designed in such a manner that the material of the at least one inner layer is swellable with heat input. This has the great advantage that swelling of the inner layer is achieved at the same time as shrinking of the outer layer which in turn enables the sheath to be arranged tightly on the elongated object.

In another advantageous embodiment of the invention, the hose is designed in such a manner that the outer layer and the at least one inner layer are joined together in places by a textile binding or by sewing or by bonding. This embodiment additionally makes it easier to fit the hose according to the invention as its two layers cannot move against each other and separate from each other when being pulled on. This makes assembly safer and more reliable.

In yet another advantageous embodiment of the invention, the hose is designed in such a manner that the outer layer and the at least one inner layer are joined together along zones extending axially and spaced apart from one another. Advantageously, this makes it possible to achieve a compact and therefore more stable structure of the hose.

In yet another advantageous embodiment of the invention, the hose is designed in such a manner that filling material in the form of threads, ribbons, preferably made from foam material, is arranged between the outer layer and the at least one inner layer in the region of chambers situated between the zones. This embodiment allows a substantial increase in the insulation properties of the hose according to the invention. The whole range of suitable insulation materials in the form of threads and ribbons, in particular made from foam material, is available.

In yet another advantageous embodiment of the invention, the hose is designed in such a manner that the outer layer and the at least one inner layer are constructed as woven fabric, weft-knitted fabric, warp-knitted fabric or braided fabric. This advantageously permits very cost-efficient production of the hose according to the invention.

In yet another advantageous embodiment of the invention, the hose is designed in such a manner that it has multifilament threads running axially and monofilament threads and multifilament threads running circumferentially. On the one hand, it is possible to control the thermal conductivity of the hose by adding multifilament threads running circumferentially which, for example, extend floatingly with the monofilament threads. On the other hand, it is possible to influence the shrinking process. In addition, this advantageous development results in more uniform shrink patterns. So-called warp gaps are prevented. The stability of the bindings increases.

In another advantageous embodiment of the invention, the hose is designed in such a manner that the outer layer is coated or impregnated with an agent which increases the wear resistance. With this advantageous measure, it is possible to achieve the individually desired lifetime of the hose according to the invention.

These agents referred to above correspond to finishing liquors known from prior art. These agents for increasing the thermal conductivity, mechanical resistance or cold cutting ability may be applied, for example by padding, doctor coating or spraying.

In yet another advantageous embodiment of the invention, the hose is designed in such a manner that it consists at least partially of finished threads. This embodiment has the advantage that, depending on the need for optimisation with regard to thermal conductivity, mechanical resistance and cold cutting ability for the desired application, individually treated threads positively influence the performance of the hose according to the invention.

In another advantageous embodiment of the invention, the hose is designed in such a manner that the at least one inner layer is wetted internally with an adhesive or a glue. This makes it possible to further enhance secure attachment of the hose according to the invention to the selected elongated object, particularly when used in a vibrating environment.

In another advantageous embodiment of the invention, the hose is designed in such a manner that the at least one inner layer is formed in the form of ribbons, in particular made from foam material. Within the inner layer in the form of ribbons, it is advantageously possible to increase the entrapped air compared to a regular thread, thus further increasing the insulating effect.

To facilitate understanding of the invention and to show how it can be embodied, it will now be briefly explained by way of an example embodiment with the aid of a drawing, in which.

Figure 1:
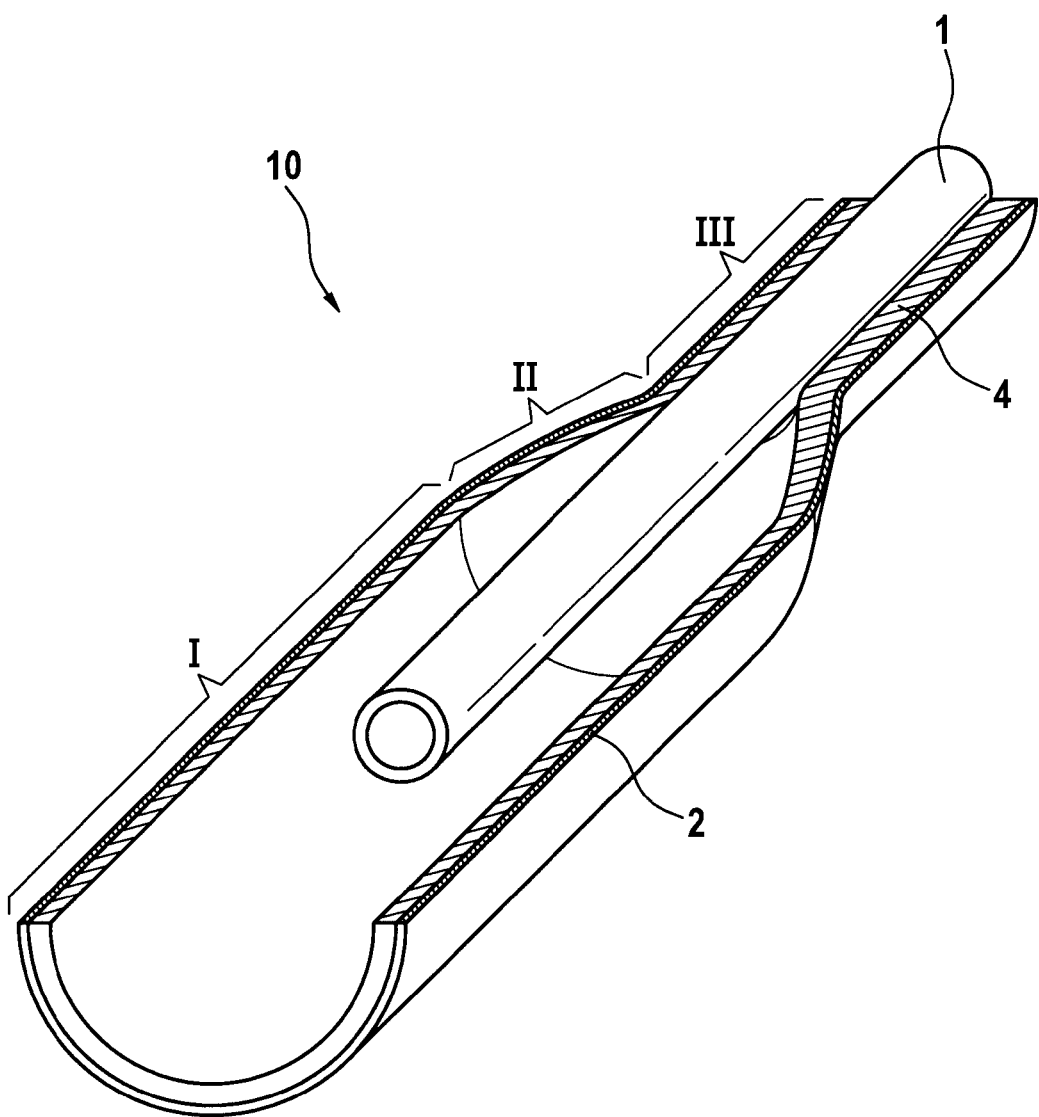
FIG. 1 is a greatly simplified diagrammatic perspective view of a section of a hose according to the invention cut lengthwise and approximately centrally, arranged around an elongated object and already partially shrunk.

FIG. 1 shows a hose 10 according to the invention cut lengthwise and approximately centrally, having an outer layer 2 and an inner layer 4. The outer layer 2 is intended to represent an abrasion-resistant sheath which surrounds the insulating inner layer 4. The hose 10 is already shrunk-on around an elongated object, here for example pipe 1, in a region III.

In regions I and II, the hose 10 still has an inner diameter which is greater than the outer diameter of the pipe 1. At the beginning of assembly, the unshrunk hose 10 according to the invention is pushed onto the pipe 1 with the diameter according to region I. Then heat is applied to it from the outside, e.g. by means of a continuous hot-air oven, shrinking it onto the pipe, with the result that it shrinks, as the transition in region II is intended to show, and attaches itself to the pipe 1. In region III, the hose 10 is fully shrunk and sits tightly on the pipe 1. It is easy to see that the insulating inner layer 4 is thicker than the abrasion-resistant outer layer 2.

In region III, the hose 10 is already fully shrunk and sits tightly on the pipe 1, the insulating inner layer 4 fitting closely. An adhesive can also be applied between insulating layer 4 and pipe 1 to fix the hose even more securely to the pipe 1.

The shrinking process is to be typified in region II. By heating the hose 10 pushed onto the pipe 1, the hose shrinks. The diameter of the textile hose 10 reduces, while at the same time the wall thickness of the insulating inner layer 4 and the wear-resistant outer layer 2 increases.

Advantageously, the thermally insulating inner layer 4 has a wall thickness of between 0.5 and 6 mm. The function of the wear-resistant outer layer 2 of the textile hose 10 is to protect the insulating inner layer 4 against mechanical effects from the outside.

Figure 2:
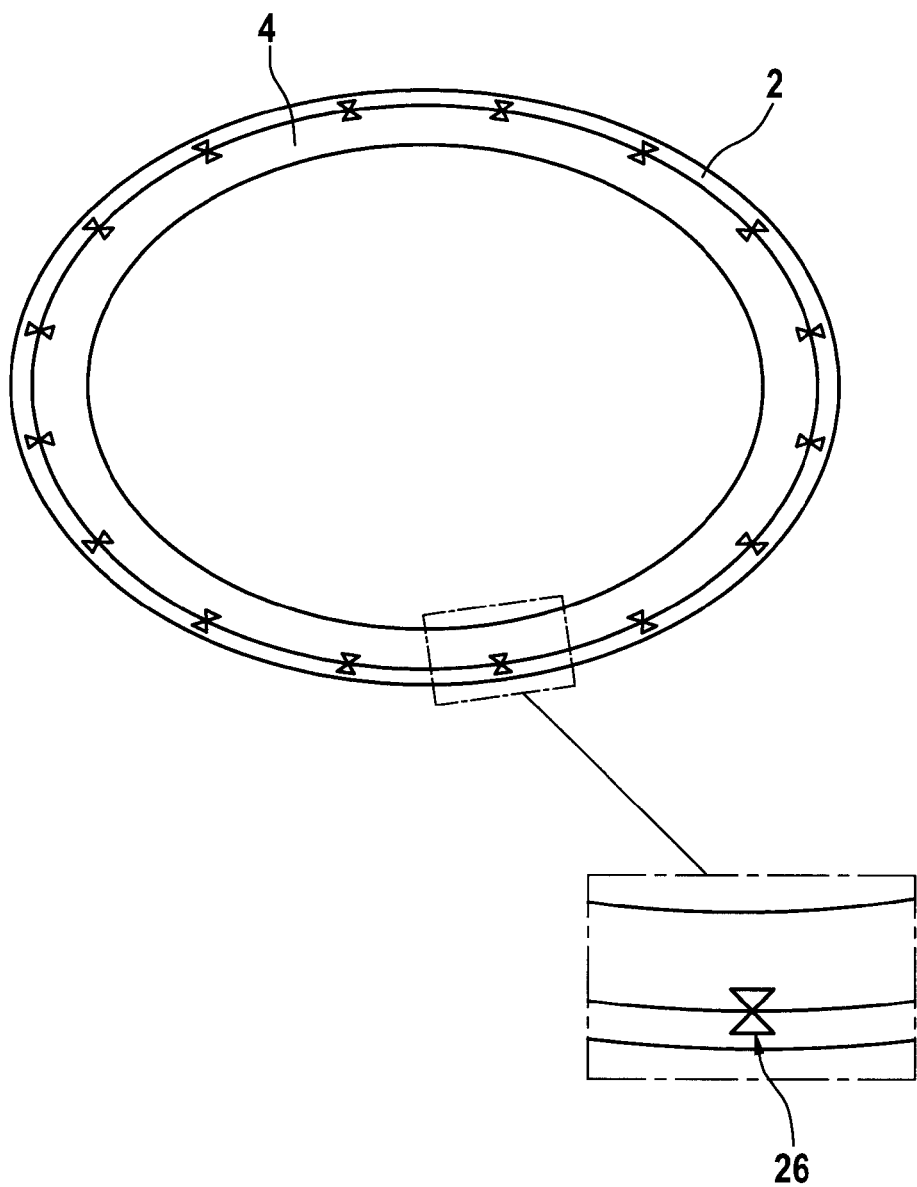
FIG. 2 is a diagrammatic view of a cross-section through the textile hose with a detail X.

FIG. 2 shows, for example, a hose 10 according to the invention executed here as a transverse-oval, with an outer layer 2 and an inner layer 4 which are joined together by means of a plurality of bindings 26, e.g. in the form of a woven binding or a basting stitch or a braided connection. When using a plurality of layers of insulating inner layers 4 as referred to above, the binding 26 may also be arranged therebetween. The bindings 26 extend not only circumferentially in the textile hose 10 but also in the longitudinal direction thereof in order to achieve a uniform interconnection of the individual layers. These bindings 26 are preferably created by interweaving during manufacture of the textile hose 10. The hose 10 according to the invention may be manufactured by weaving, warp-knitting, weft-knitting or braiding. Subsequent fixing by means of adhesive technology or by sewing the individual layers would also be conceivable as ties 26. The arrangement of a tie 26 is shown enlarged in FIG. 2, bottom right.

Figure 3:
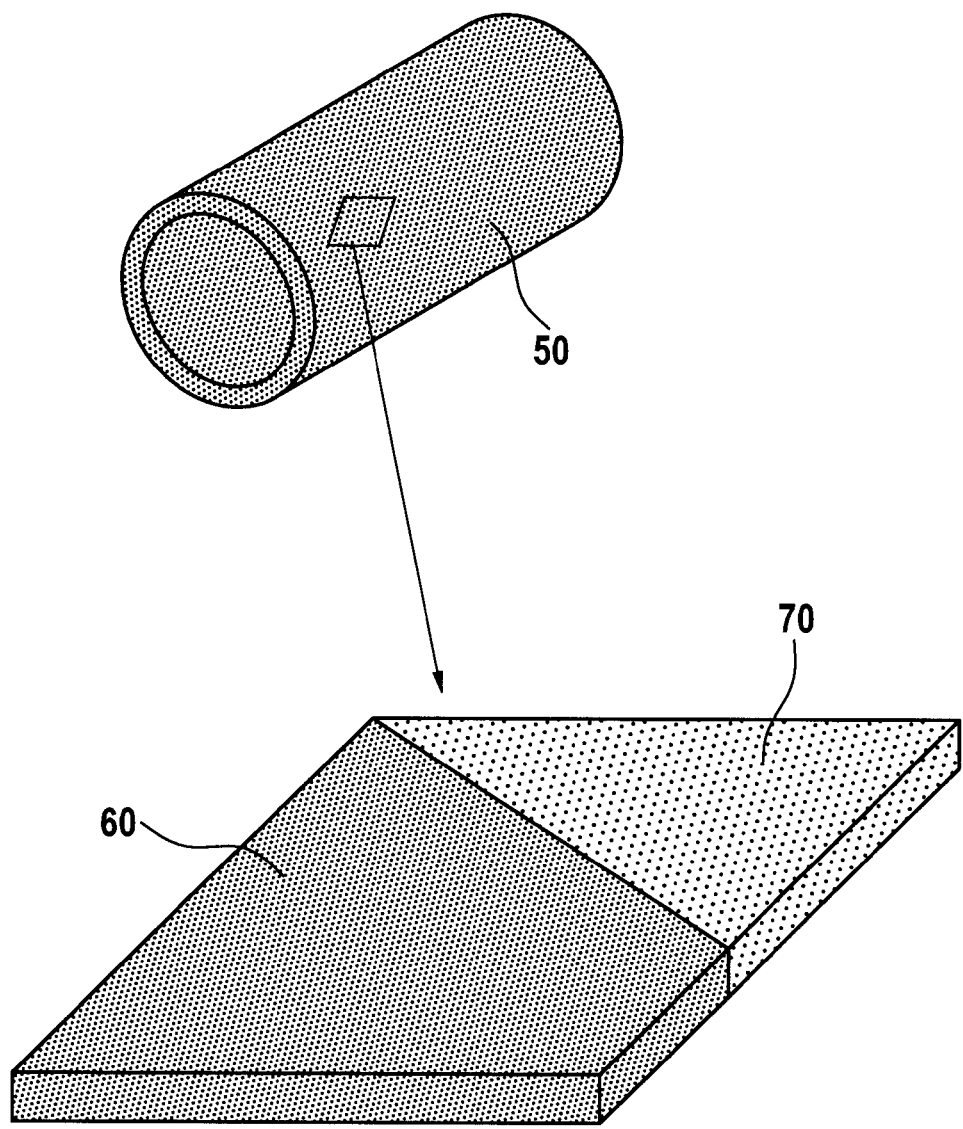
FIG. 3 is a greatly simplified diagrammatic perspective view of a section of an embodiment of a hose according to the invention.

FIG. 3 shows a diagrammatic illustration of a textile hose 50 as it is after finishing with an expedient finishing liquor to improve the thermal conductivity, mechanical resistance or. Here a detail of the textile hose 50 is enlarged to show that the finishing liquor (that is a fluid for treating or finishing a textile object, see above), hereinafter referred to as a "coating", impregnates the textile hose 50. Here the reference number 60 indicates, for example, textile layers of the hose which are completely impregnated, while reference number 70 is intended to indicate textile layers in their unfinished form (before the application of a finishing liquor).

It would also be conceivable to wet only the surface of the textile hose superficially and thus to dispense with completely impregnating the entire textile hose. Due to superficial wetting, the finishing (finishing liquor) does not "stiffen" the inner layers which preserves the bulkiness of the threads of the inner layer and allows better insulation values to be achieved. In addition, there is the advantage that finishing material can be saved.

Figure 4:
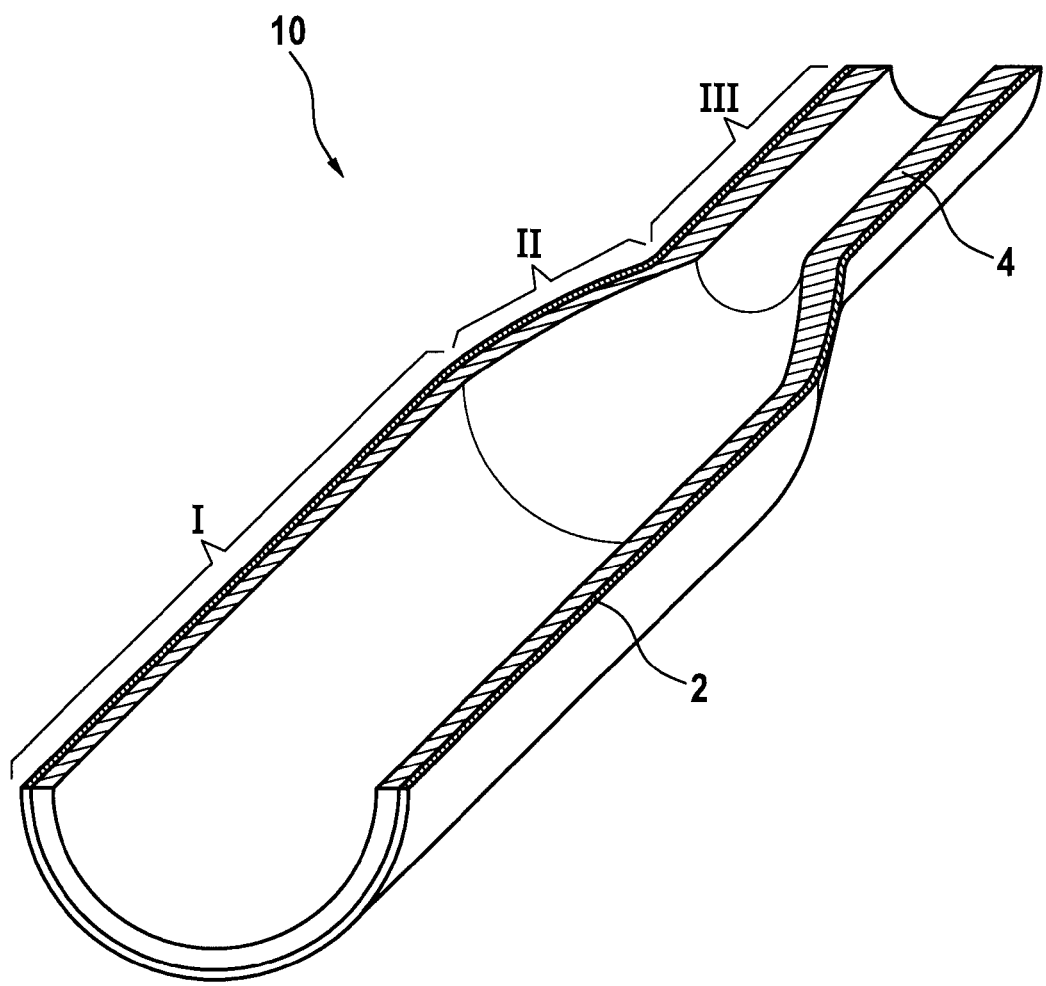
FIG. 4 is a greatly simplified diagrammatic perspective view of a section of a hose according to the invention cut lengthwise and approximately centrally, similar to FIG. 1 without elongated object.

FIG. 4 is a greatly simplified diagrammatic perspective view of a section of a hose according to the invention cut lengthwise and approximately centrally, similar to FIG. 1.

Figure 5:
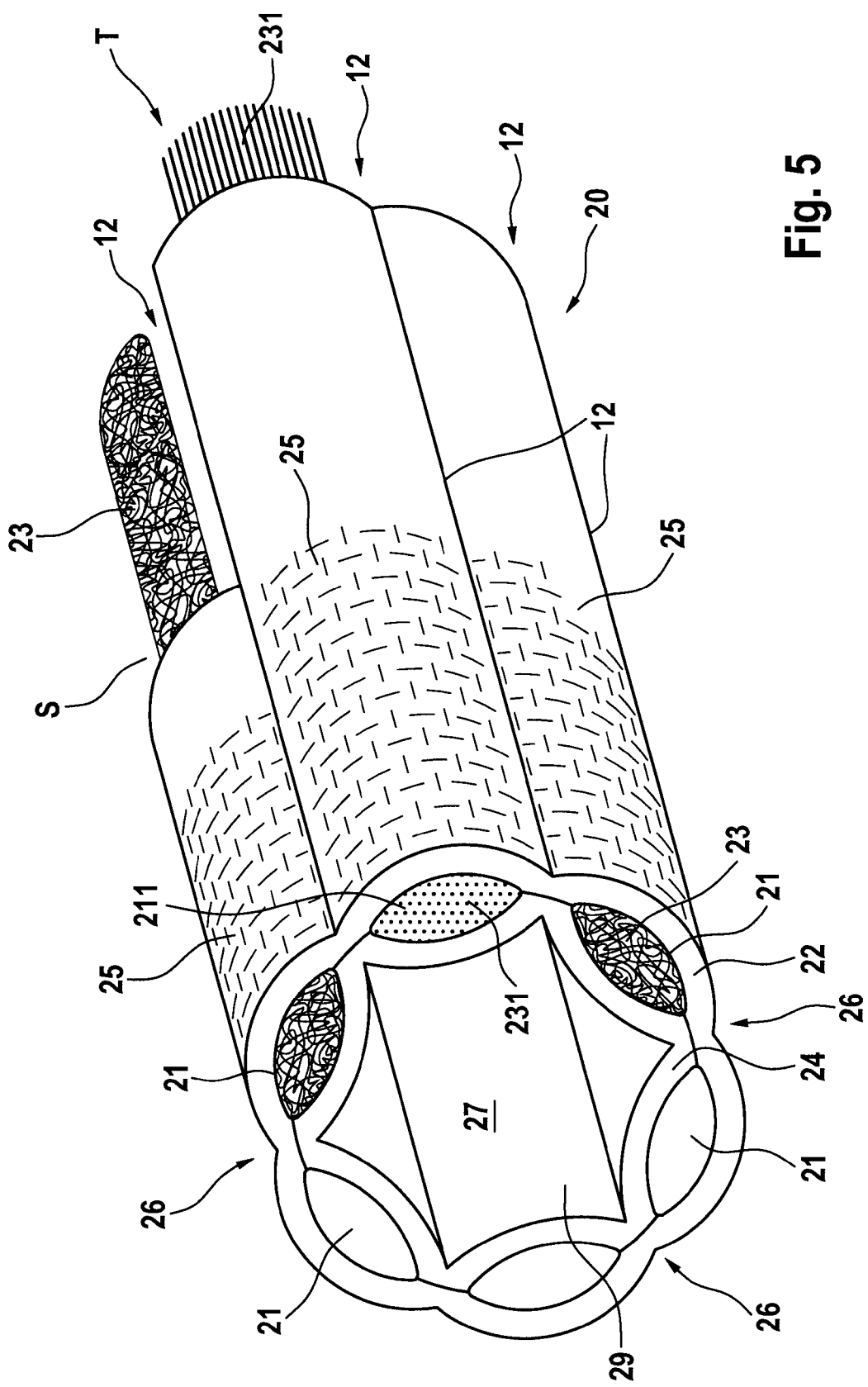
FIG. 5 is a greatly simplified diagrammatic perspective view of a section of a radially shrinkable textile hose according to the invention with longitudinal chambers.

FIG. 5 is a greatly simplified diagrammatic perspective view of a section of a radially shrinkable textile hose 20 according to the invention with an outer layer 22 and an inner layer 24, as well as with longitudinal chambers 21 situated therebetween which are partially filled with filler threads 23. The inner layer 24 surrounds an interior space 27 in which elongated objects (not shown), such as pipes, tubes, cables, etc., may find space, or which may be encased with the hose 20 according to the invention. If the hose 20 according to the invention is "pulled on" around an elongated object (FIG. 1), it can then be shrunk by means of heat so that it fits tightly around the elongated object and holds fast there. Advantageously, the inner surface 29 of the inner layer 24 may also be provided with an adhesive, via which even better adhesion of the hose 20 to the elongated object can be achieved during shrink-fitting. Some of the filled chambers 21 in the embodiment according to FIG. 5 contain filling material 23 in the form of threads, ribbons, preferably made from foam material, by means of which it is possible to considerably increase the insulation capacity of the hose 20.

The outer layer 22 and the inner layer 24 of the hose 20 according to the invention are woven, for example, as shown in FIG. 5 and joined together in the region of zones 12 via e.g. woven bindings 26. Chambers 21 are arranged between the zones 12 extending longitudinally. On the outside of the outer layer 22 are threads of a plain weave L 1/1, as indicated by -l-l-l-l-l-, in which the hose 20 according to the invention, for example, is woven. However, other weaving patterns may also be used. The hose, however, may also be weft-knitted, braided or warp-knitted. The outer layer 22 consists of shrinkable wear-resistant material and the inner layer 24 of thermally insulating material.

Filler threads 23, which are arranged in the chambers 21, are used in addition for thermal insulation of the inner layer 24. FIG. 5, top right, shows an "exposed" "filling" of a chamber 21 in the form, for example, of crimped threads 23. For this purpose, the corresponding chamber is shown cut away at the point "S". However, it is also possible to use a plurality of other filling materials. A chamber 211 is filled, for example, with stretched threads 231 which are shown "exposed" at the point T23. In addition, tubes, any suitable thermal insulating material, even in fleece or ribbon form, may be used. The present embodiment shows a hose 20 with an inner layer 24. According to the invention, however, a plurality of inner layers 24 may also be arranged on top of or inside each other like onion skins, in order, for example, to increase the thermal insulation capacity of the hose 20.

The invention claimed is:

1. Radially shrinkable textile sleeve for encasing elongated objects, comprising:
   a) an outer layer (2) made from shrinkable wear-resistant material; and
   b) at least one inner layer (4) made from thermally insulating material;
   wherein the material of the at least one inner layer (4) is swellable with heat input.

2. The sleeve according to claim 1, wherein the outer layer (2) and the at least one inner layer (4) are joined together in places by a textile binding (26) or by sewing or by bonding.

3. The sleeve according to claim 2, wherein the outer layer (2) and the at least one inner layer (4) are joined together along zones (12) extending axially and spaced apart from one another.

4. The sleeve according to claim 3, wherein between the outer layer (2) and the at least one inner layer (4), chambers (14) are situated between the zones (12), and wherein filling material (23), in the form of threads, ribbons, or made from foam material, is arranged between the outer layer (2) and the at least one inner layer (4) in the region of the chambers (21).

5. The sleeve according to claim 1, wherein the outer layer (2) and the at least one inner layer (4) are constructed as woven fabric, weft-knitted fabric, warp-knitted fabric or braided fabric.

6. The sleeve according to claim 1, further comprising multifilament threads running axially and monofilament threads and multifilament threads running circumferentially.

7. The sleeve according to claim 1, wherein the outer layer (2) is coated or impregnated with an agent which increases the wear resistance.

8. The sleeve according to claim 1, composed at least partially of finished threads.

9. The sleeve according to claim 1, wherein the at least one inner layer (4) is wetted internally with an adhesive or a glue.

10. The sleeve according to claim 1, wherein the at least one inner layer (4) is formed in the form of ribbons made from foam material.

11. The sleeve according to claim 1, wherein the sleeve has a thermal conductivity ≤0.3 W/m×K.

12. The sleeve according to claim 1, wherein the sleeve has a wall thickness ranging from 1 to 8 mm.

\* \* \* \* \*